July 25, 1967  R. G. SCHAALE  3,332,441
WICKET GATE END SEALS
Filed Sept. 2, 1964

FIG. I

INVENTOR
ROBERT G. SCHAALE
BY John P. Hines
ATTORNEY

3,332,441
WICKET GATE END SEALS

Robert G. Schaale, York, Pa., assignor to Allis-Chalmers Manufacturing Company, Milwaukee, Wis.
Filed Sept. 2, 1964, Ser. No. 393,872
2 Claims. (Cl. 137—599)

This invention pertains in general to wicket gates for hydraulic turbines and more particularly to a means for providing a seal between the end surfaces of the wicket gates and the turbine casing.

In hydraulic turbines, it is the usual practice to utilize an annular series of movable wicket gates cooperating with stationary side plates located at the ends of the gates to control the admission of liquid to the hydraulic turbine runner. The successive wicket gates of the series are ordinarily pivotally adjustable about parallel axes and a slight clearance is usually provided between the ends of each gate and the adjacent side plates. When the gates are in closed position, the adjacent gates coact with each other to shut off the major portion of the liquid flow. However, the working clearances at the ends of the gates allow considerable liquid to leak from the supply into the runner chamber.

Seals have been provided between the side plates and the ends of the wicket gates in an effort to control this leakage. However, as pressures have increased, more efficient sealing has become necessary, and it is the main object of this invention to provide an improved seal between the side plates and the ends of the wicket gates.

A more specific object of the subject invention is to provide a seal means between the turbine side plates and the ends of the wicket gates which includes a resiliently biased metallic seal portion which is contained in the side plates and which is resiliently biased into the gate ends to provide an effective seal therebetween.

These and other objects of the subject invention will become more fully apparent as the folowing description is read in light of the attached drawing, wherein:

FIGURE 1 is a fragmentary horizontal sectional view showing two wicket gates in closed position;

Figures 2, 3:
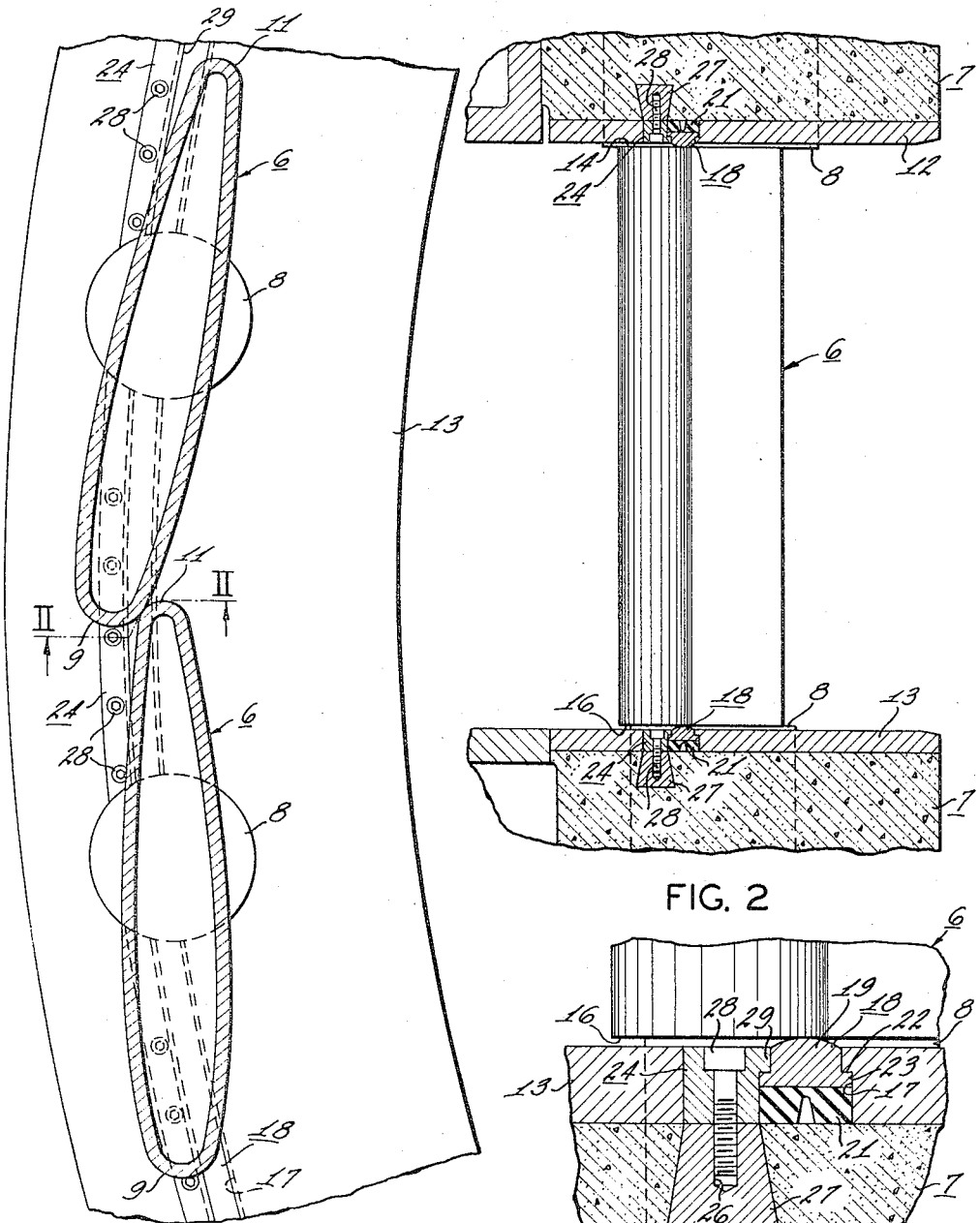
FIG. 2 is a section taken along the lines II—II in FIG. 1.
FIG. 3 is an enlarged fragmentary sectional view showing the seal of the subject invention in engagement with the end of a wicket gate.

Referring to the drawing, a plurality of wicket gates generally designated 6 are supported in a concrete foundation generally designated 7. The wicket gates are pivotally supported to the concrete foundation by means of trunnions 8 and define an annulus about the turbine runner (not shown). Each wicket gate has a general air foil configuration having a leading edge 9 and a trailing edge 11. When in closed position, as shown in FIG. 1, the leading edge of one wicket gate contacts the trailing edge of the adjacent wicket gate effecting a seal along the contacting vertical surfaces.

Annular side plates 12 and 13 are provided in the concrete foundation adjacent opposite ends 14 and 16, respectively, of the wicket gates.

The seal of the subject invention is located in a series of arcuate grooves 17 provided in the surfaces of the side plates facing the ends 14 and 16 of the wicket gates. The grooves 17 extend between the trunnions 8 of adjacent gates. The seal generally designated 18 is composed of a series of elongated arcuate rubber backed metallic sections. The metallic portion 19 may be of any convenient configuration and is herein shown in cross section as having a crown thereon which extends above the inner surface of the side plates 12 and 13. The resilient portion 21 may also be of any convenient configuration so as to urge the metallic portion 19 into engagement with the ends of the wicket gate. It should be noted that the end faces of the wicket gates are flush so that all portions thereof which come in alignment with the metallic portion 19 would provide an effective seal.

Any convenient means may be utilized to hold the seal portions in the grooves 17. As herein shown for purposes of illustration, the grooves 17 are provided with a shoulder 22. Furthermore, the metallic portion 19 of the seal is also provided with oppositely extending shoulders 23, one of which fits under the shoulder 22 of the groove 17. The opposite shoulder of the metallic portion 19 may be clamped into place by means of an arcuate locking member generally designated 24. The locking member may be provided with a series of spaced openings therethrough which align with threaded openings 26 in anchors 27 provided in the concrete foundation 7. Screws or other attaching means 28 may be threaded into the threaded openings 26 to hold the locking means 24 into place. The locking means is provided with a shoulder 29 which overlies the opposite shoulder of the metallic seal portion 19. In this manner, the seal 18 is held in the grooves 17 in such a manner that the metallic portions 19 extend above the inner surface of the side plates 12 and 13 a sufficient amount so as to interfere with the closing of the wicket gates. As the wicket gates are closed, the ends thereof wipe over the metallic portions of the seal thereby providing an effective liquid seal between the ends of the wicket gates and the turbine side plates.

Although only one embodiment of the subject invention has been herein shown and described, it will be apparent as this description is read that other modifications are possible, and all such modifications as come within a reasonable interpretation of the appended claims are intended to be covered.

The embodiments of the invention in which an exclusive property or privilege is claimed are defined as follows:

1. In combination with a hydraulic machine including a plurality of wicket gates having trunnions pivotally supported in side plates located adjacent to opposite ends of said gates, means providing a liquid seal between said side plates and said gate ends comprising: a plurality of elongated arcuate grooves in the surface of said side plates in alignment with and facing said vane ends when said vanes are in closed position said arcuate grooves extending only between adjacent wicket gate trunnions; a first resilient seal portion contained in the bottom of each groove; a second metallic seal portion contained in each groove between said resilient portion and said gate ends, said resilient portion urging said metallic portion into liquid sealing engagement with the ends of said gates when said gates are in closed position, the opposite end portions of said metallic portions being in liquid sealing engagement with said gate trunnions; and means holding said seal portions in said grooves.

2. The combination set forth in claim 1 wherein said first and second seal portions are a single element composed of a metallic seal having a resilient backing thereon which urges said seal portion into sealing engagement with the end of said gates.

References Cited
UNITED STATES PATENTS

| | | | |
|---|---|---|---|
| 2,665,461 | 1/1954 | Rodgers. | |
| 3,084,715 | 4/1963 | Scharres | 137—601 |
| 3,123,098 | 3/1964 | Bishop | 137—601 |
| 3,180,246 | 4/1965 | Johnson | 98—110 X |

WILLIAM F. O'DEA, *Primary Examiner.*

D. H. LAMBERT, *Assistant Examiner.*